US008621276B2

(12) United States Patent
Havewala et al.

(10) Patent No.: US 8,621,276 B2
(45) Date of Patent: Dec. 31, 2013

(54) FILE SYSTEM RESILIENCY MANAGEMENT

(75) Inventors: Sarosh C. Havewala, Kirkland, WA (US); Neal R. Christiansen, Bellevue, WA (US); John D. Slingwine, Duvall, WA (US); Daniel Chan, Redmond, WA (US); Craig A. Barkhouse, Redmond, WA (US); Lane Haury, Kirkland, WA (US); Kiran Kumar G. Bangalore, Sammamish, WA (US); Thiago Sigrist, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 417 days.

(21) Appl. No.: 12/970,985

(22) Filed: Dec. 17, 2010

(65) Prior Publication Data

US 2012/0159256 A1 Jun. 21, 2012

(51) Int. Cl.
*G06F 11/00* (2006.01)

(52) U.S. Cl.
USPC ............ 714/21; 714/6.1; 714/6.11; 714/6.31; 714/25; 714/42

(58) Field of Classification Search
USPC ........... 714/6.1, 6.11, 6.31, 21, 25, 40, 42, 54
See application file for complete search history.

(56) References Cited

U.S. PATENT DOCUMENTS

| | | | |
|---|---|---|---|
| 5,765,151 A | 6/1998 | Senator | |
| 5,870,762 A * | 2/1999 | Lee | ........................................ 1/1 |
| 6,718,446 B1 * | 4/2004 | Peters et al. | ................... 711/162 |
| 7,032,123 B2 | 4/2006 | Kane et al. | |
| 7,143,120 B2 | 11/2006 | Oks et al. | |
| 7,293,044 B2 * | 11/2007 | Ghotge et al. | ........................ 1/1 |
| 7,389,379 B1 | 6/2008 | Goel et al. | |
| 7,506,213 B1 * | 3/2009 | Cabrera et al. | ................... 714/42 |
| 7,523,343 B2 | 4/2009 | Leis, et al. | |
| 7,526,686 B2 * | 4/2009 | Kolvick et al. | ................... 714/54 |
| 7,653,647 B2 * | 1/2010 | Borthakur et al. | ............ 707/687 |
| 7,739,447 B1 | 6/2010 | Rodrigues | |
| 7,752,492 B1 | 7/2010 | Armangau, et al. | |
| 7,756,834 B2 * | 7/2010 | Masters et al. | ................. 707/640 |
| 7,827,440 B1 * | 11/2010 | Dudte et al. | ................. 714/6.12 |

(Continued)

OTHER PUBLICATIONS

"Troubleshooting Disks and File Systems", Retrieved at << http://technet.microsoft.com/en-us/library/bb457122%28printer%29.aspx>>,Nov. 3, 2005, pp. 48.

(Continued)

*Primary Examiner* — Joshua P Lottich
(74) *Attorney, Agent, or Firm* — Chin IP, PLLC; David Chin

(57) ABSTRACT

Perceived corruptions encountered on file system volumes, and which cannot be initially remedied online, are processed to verify whether they are true, existing volume data structure corruptions or, alternatively, false positives. Upon the verification of one or more of a volume's corruptions, error scanning is performed to check for, and attempt to remedy online, all the existing corruptions on the volume. Subsequent to error scanning processing, if one or more verified corruptions continue to exist on a file system volume, at file system boot up time spot corruption correction is performed to attempt to remedy the existing, verified corruptions on the volume. Spot corruption correction is performed to attempt to correct verified data structure corruptions on a volume of the file system while the volume is maintained offline for the time necessary to attempt to correct its prior identified corruptions.

20 Claims, 8 Drawing Sheets

(56) References Cited

U.S. PATENT DOCUMENTS

| | | | |
|---|---|---|---|
| 7,930,491 B1* | 4/2011 | Xu et al. | 711/154 |
| 8,074,103 B2 | 12/2011 | Dilman et al. | |
| 8,171,000 B2* | 5/2012 | Seeger et al. | 707/691 |
| 2002/0169998 A1* | 11/2002 | Largman et al. | 714/25 |
| 2003/0182389 A1 | 9/2003 | Edwards | |
| 2004/0054989 A1* | 3/2004 | Harres | 717/124 |
| 2005/0039144 A1 | 2/2005 | Wada et al. | |
| 2005/0097141 A1 | 5/2005 | Loafman, et al. | |
| 2005/0228832 A1* | 10/2005 | Ghotge et al. | 707/200 |
| 2005/0246612 A1* | 11/2005 | Leis et al. | 714/763 |
| 2005/0257131 A1 | 11/2005 | Lim et al. | |
| 2006/0218500 A1 | 9/2006 | Sauve et al. | |
| 2007/0100905 A1* | 5/2007 | Masters et al. | 707/201 |
| 2007/0157118 A1 | 7/2007 | Wuttke | |
| 2008/0222078 A1 | 9/2008 | Godbole | |
| 2008/0263474 A1 | 10/2008 | Wormald | |
| 2009/0089628 A1 | 4/2009 | Day et al. | |
| 2009/0106327 A1* | 4/2009 | Dilman et al. | 707/202 |
| 2009/0157770 A1 | 6/2009 | Havewala, et al. | |
| 2009/0164922 A1 | 6/2009 | Phakousonh et al. | |
| 2010/0058054 A1 | 3/2010 | Irvine | |
| 2012/0159243 A1 | 6/2012 | Havewala et al. | |
| 2012/0159255 A1 | 6/2012 | Havewala et al. | |

OTHER PUBLICATIONS

Demsky, et al., "Automatic Data Structure Repair for Self-Healing Systems", Retrieved at << http://people.csail.mit.edu/rinard/paper/sms03.pdf >>, 2001, pp. 6.

Gunderloy, Mike, "Do You Need a Site-Specific Browser?", Retrieved at << http://gigaom.com/collaboration/do-you-need-a-site-specific-browser/>>, Dec. 13, 2007, pp. 8.

Non-Final Office Action in U.S. Appl. No. 12/970,948 mailed Apr. 4, 2013, 7 pages.

Non-Final Office Action in U.S. Appl. No. 12/970,954 mailed Apr. 24, 2013, 9 pages.

Perez, Sarah, "The Future of Firefox Personas: Dynamically Changing and Filled with Ambient Info", Retrieved at << http://www.readwriteweb.com/archives/the_future_of_firefox_personas_dynamically_changin.php >>, Mar. 4, 2010, pp. 2.

Wilson, Michael, "Fight crime. Unravel incidents . . . one byte at a time", Retrieved at<< http://computer-forensics.sans.org/community/papers/rootkit_128 >>, Oct. 5, 2004, pp. 106.

"Solaris ZFS", Retrieved at << http://www.sun.com/software/solaris/zfs.jsp >>, Mar. 1, 2010, pp. 4.

Galli, Peter, "Sun Unveils Its Next-Generation File System", Retrieved at << http://www.eweek.com/c/a/Linux-and-Open-Source/Sun-Unveils-Its-NextGeneration-File-System/ >>, Jun. 1, 2004, pp. 3.

Jones, Tim, "Anatomy of ext4", Retrieved at << http://www.ibm.com/developerworks/linux/library/1-anatomy-ext4/index.html?ca=drs- >>, Feb. 17, 2009, pp. 7.

"Whitepaper Gluster File System Architecture", Retrieved at << http://www.raidinc.com/pdf/whitepapers/wp-gfs-architecture.pdf >>, Retrieved Date:Sep. 6, 2010, pp. 1-12.

"Data Domain Data Invulnerability Architecture", Retrieved at << http://expocad.1105web.com/fetc/Data/EC/Event/Exhibitors/446/productBrochure1.pdf >>, pp. 6, Jan. 21, 2009.

Leis, et al., "Real Time File System Repairs", U.S. Appl. No. 10/954,664, filed Sep. 30, 2004, pp. 80.

"Using LVM snapshots for filesystem recovery", Retrieved at <<http://madduck.net/blog/2006.08.30:lvm-for-filesystem-recovery/>>, Jul. 11, 2008, pp. 3.

Henson, et al., "Chunkfs: Using divide-and-conquer to improve file system reliability and repair", Retrieved at <<http://www.usenix.org/events/hotdep06/tech/prelim_papers/henson/henson_old.pdf>>, Retrieved Date: Sep. 6, 2010, pp. 6.

* cited by examiner

FILE SYSTEM RESILIENCY MANAGEMENT

CROSS-REFERENCE TO RELATED APPLICATIONS

This application is related to commonly assigned, co-pending U.S. patent application Ser. No. 12/970,948, entitled "Online Fault Verification In A File System", and commonly assigned, co-pending U.S. patent application Ser. No. 12/970,954, entitled "Proactive Error Scan And Isolated Error Correction", each of which is filed herewith and incorporated herein by reference in their entirety.

BACKGROUND

File systems utilize data structures, also referred to as file system on-disk formats, to persist and organize data on non-volatile, i.e., persistent, storage, e.g., a volume, disk, hard drive, etc. Systems access and interpret these data structures to store and retrieve data for users and applications, or procedures or computer programs, e.g., when executing software instructions or computer code.

Currently, errors, i.e., corruptions, are discovered in the file system data structures when an attempt is made to access the faulty data structure during normal application or user-instigated processing. The discovery of an error causes the volume on which the error has occurred to be flagged as corrupt. Once a volume has been flagged as corrupt a volume repair utility is generally required to attempt to bring the file system's on-disk formats into a consistent state. Typically, a volume repair utility is executed during a system boot up.

A volume repair utility requires exclusive access to the volumes of the file system so during the tenure of its execution data and information stored on the file system's volumes being repaired cannot be accessed by other applications or users. Moreover, the volume repair utility may execute for a significant amount of time which further degrades file system performance and negatively impacts user satisfaction.

Additionally, there are occurrences when it is believed that an error has been encountered during an access of an on-disk format, yet the error is not a true corruption at all, but rather can be attributed to other events, e.g., transient errors in volatile system memory, transient errors in the system's persistent storage, bugs in the file system, etc. However, currently there is no mechanism to discern real on-disk corruptions from these other error events, i.e., false positives. As a result file system volumes are unnecessarily taken offline and rendered unavailable to users and other tasks when the file system attempts to correct false positives, further causing unnecessary system disruption.

Thus, it is desirable to promote file system resiliency management for searching for, the verification of, and the correction of data structure corruptions with minimal disruption to user and application data structure access.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methodology for file system resiliency management which includes the detection and correction of file system volume errors, or corruptions.

In embodiments corruption verification is performed on perceived corruptions that are encountered within a file system and for which an online attempt to remedy has been unsuccessful. In an embodiment initially encountered corruptions in a file system's volumes are perceived corruptions because they may be true, existing corruptions associated with one or more data structures on one or more file system volumes, or, alternatively, they can be false positives. In an embodiment a false positive is an encountered condition within the file system that is initially identified as a volume corruption but is subsequently determined not to be a true, existing volume data structure corruption. In embodiments the corruption verification processes to verify whether a previously encountered perceived corruption is a true, existing corruption or to determine that a previously encountered perceived corruption is a false positive.

In embodiments corruption verification is performed while all volumes of the file system remain online and accessible to other processing tasks and users.

In embodiments error scanning is performed for volumes of a file system to proactively identify existing corruptions thereon. In embodiments the error scanning is performed subsequent to corruption verification processing that results in the verification of one or more true, existing corruptions. In embodiments error scanning is also, or alternatively, performed at the request or command of a user.

In embodiments the error scanning processes while all volumes of the file system remain online and accessible to other processing tasks and users.

In embodiments spot corruption correction is initiated to process at file system boot up time, i.e., when the file system is initiating to process, when there exists one or more true, existing volume corruptions that were not previously successfully remedied online. In embodiments spot corruption correction is performed while a volume whose corruptions are being processed for attempted correction is maintained offline while the other volumes of the file system are still online. In aspects of these embodiments a volume is maintained offline only for the time necessary to attempt to remedy its corruptions.

BRIEF DESCRIPTION OF THE DRAWINGS

These and other features will now be described with reference to the drawings of certain embodiments and examples which are intended to illustrate and not to limit, and in which.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
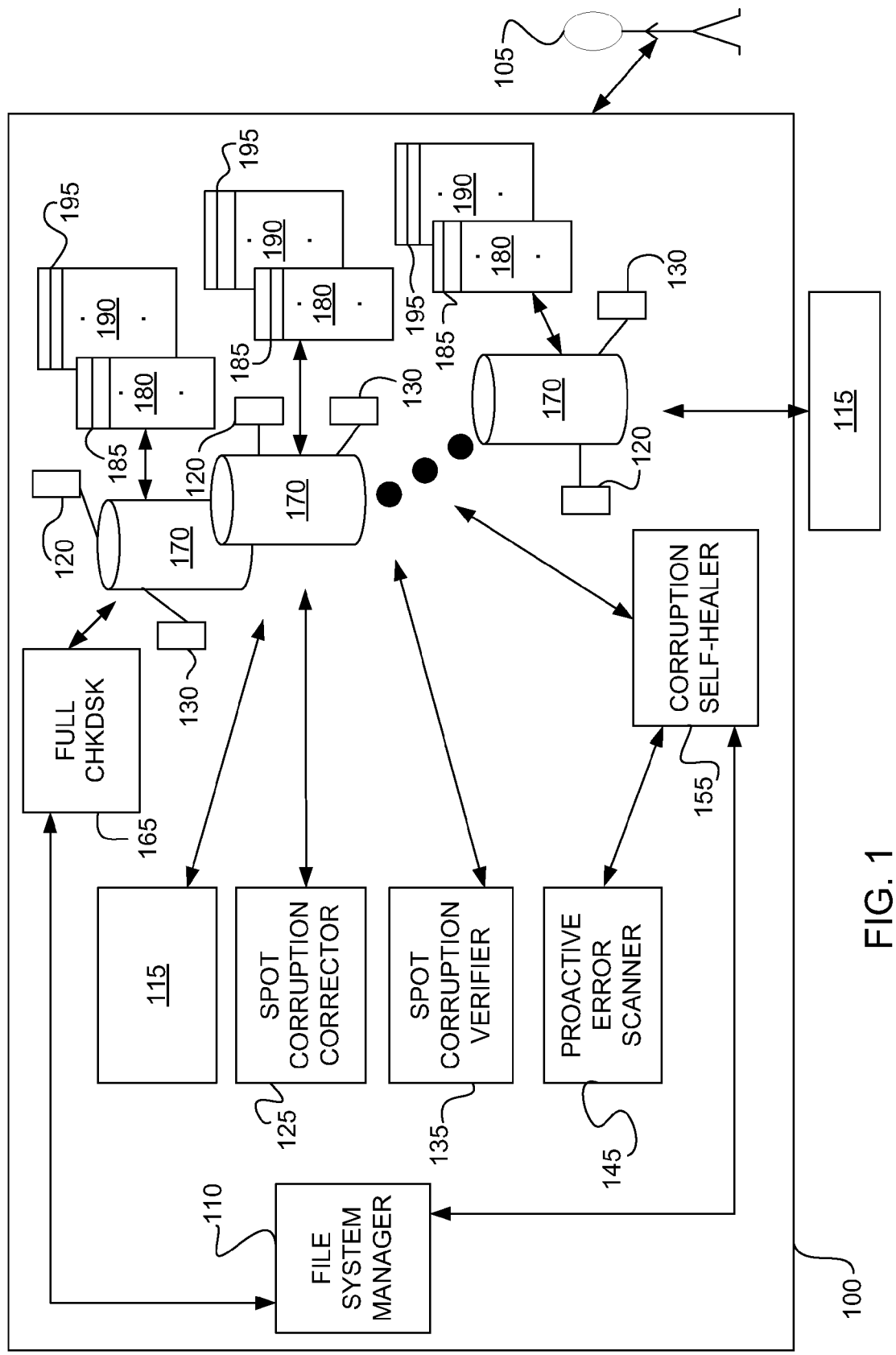
FIG. 1 depicts an embodiment file system supporting data structure error detection and correction resiliency management.

FIG. 1 depicts an embodiment file system 100 that is capable of supporting resiliency management. In an embodiment resiliency management includes the detection and correction of file system volume errors, also referred to herein as corruptions.

In an embodiment the file system 100 has one or more volumes 170 that store data in data structures for use by processing applications, tasks, programs, routines, etc., collectively referred to as processing tasks 115 herein, and users 105. In an embodiment one volume 170 of the file system 100 is a system volume 170 and all other volumes 170 of the file system 100 are non-system, i.e., general purpose, volumes 170.

In embodiments processing tasks 115 can be part of the file system 100 and/or separate from the file system 100.

In an embodiment the file system 100 has a file system manager component 110. In an embodiment the file system manager 110 is a software application task with the capability to manage the file system 100 to assist in ensuring proper processing and operation.

In an embodiment, if a condition, also referred to herein as a perceived error, is initially encountered while a user 105, a processing task 115 or the file system manager 110 is attempting to access data on a file system volume, also referred to herein as a volume, 170, the file system manager 110 schedules, or otherwise initiates the processing of, a corruption self-healer component 155. In an embodiment the corruption self-healer 155 processes to correct, or otherwise remedy, the perceived error while the respective volume 170 remains online and is therefore still available for access.

In an embodiment each volume 170 of the file system 100 has an associated first volume log 180, e.g., a $Verify file, also referred to as an error verification log 180 or a volume verification log 180, where perceived encountered data structure errors for the respective volume 170 are recorded, or otherwise indicated. In other embodiments perceived encountered data structure errors, also referred to herein as volume errors or volume corruptions, are reported by the use of other mechanisms, e.g., a single volume verification log 180 is utilized to report all volume errors for all volumes 170 of the file system 100, error tables are written to to keep track of identified volume errors, etc.

In an embodiment if the corruption self-healer 155 cannot remedy a volume corruption, the corruption self-healer 155 notifies the file system manager 110. In turn, in an embodiment the file system manager 110 generates an entry 185 identifying the volume corruption in the volume verification log 180 for the respective volume 170.

In an alternative embodiment, if the corruption self-healer 155 cannot remedy a volume corruption the corruption self-healer 155 generates an entry 185 identifying the volume corruption in the volume verification log 180 for the respective volume 170.

An embodiment file system 100 has a spot corruption verifier component 135. In an embodiment the spot corruption verifier 135 is a software application task that is initiated to execute by the file system 100 when one or more volume errors, or volume corruptions, have been flagged, i.e., logged with entry(s) 185 in their respective volume verification log(s) 180. In an embodiment the spot corruption verifier 135 can execute, or otherwise process, while all file system volumes 170 remain online.

In an embodiment the spot corruption verifier 135 processes the entries 185 in various volumes' volume verification logs 180. In an embodiment the spot corruption verifier 135 has the capability to verify flagged volume corruptions as true, existing, errors. In an embodiment the spot corruption verifier 135 also has the capability to determine that flagged volume corruptions are false positives, i.e., they are not true volume data structure corruptions.

In an embodiment the spot corruption verifier 135 processes prior flagged volume corruptions; i.e., those volume corruptions that have been previously identified and have a volume verification log entry 185. In an aspect of this embodiment the spot corruption verifier 135 does not look for, or otherwise process, any other possible volume corruptions other than those for which a prior volume verification log entry 185 has been generated.

In an embodiment the spot corruption verifier 135 notifies the file system manager 110 when it deems a flagged volume corruption to be a false positive, i.e., when the spot corruption verifier 135 concludes that a flagged data structure error does not in fact exist. In an embodiment, an entry 185 in an error verification log 180 for a false positive is rendered irrelevant, or deleted, collectively referred to herein as deleted, from the respective error verification log 180. In an aspect of this embodiment the file system manager 110 deletes entries 185 in error verification logs 180 for false positives when notified of the false positives by the spot corruption verifier 135. In an alternative aspect of this embodiment the spot corruption verifier 135 deletes entries 185 in error verification logs 180 for false positives.

In an embodiment the spot corruption verifier 135 notifies the file system manager 110 when it deems a flagged volume corruption to be a true, existing, i.e., confirmed, error.

In an embodiment, an entry 185 in an error verification log 180 for a confirmed error is rendered irrelevant, or deleted, collectively referred to herein as deleted, from the respective volume verification log 180. In an aspect of this embodiment the file system manager 110 deletes entries 185 in error verification logs 180 for confirmed errors when notified of the confirmed errors by the spot corruption verifier 135. In an alternative aspect of this embodiment the spot corruption verifier 135 deletes entries 185 in error verification logs 180 for confirmed errors.

In an embodiment each volume 170 has an associated dirty bit, or flag, 120 that, when set, indicates that the volume 170 has at least one existing confirmed corruption on it. In an embodiment the file system manager 110 sets a volume's dirty bit 120 when the file system manager 110 is notified of a confirmed corruption by the spot corruption verifier 135. In an alternative embodiment, the spot corruption verifier 135 sets a volume's dirty bit 120 upon its verification of a volume corruption.

In an embodiment each volume 170 of a file system 100 has an associated second volume log 190, e.g., a $Corrupt file, also referred to as an error correction log 190, a volume corrupt log 190, a corrupt log 190 or a volume corruption log 190, where confirmed data structure errors for the respective volume 170 are recorded, or otherwise indicated. In other embodiments confirmed data structure errors, also referred to herein as confirmed errors or confirmed corruptions, are reported by the use of other mechanisms, e.g., a single volume corruption log 190 is utilized to report all confirmed errors for all the file system's volumes 170, error tables are written to to keep track of confirmed errors, etc.

In embodiments the file system manager 110 also, or alternatively, generates an entry 195 identifying a confirmed error in the volume corruption log 190 for the respective volume 170 when notified of the confirmed error by the spot corruption verifier 135. In an aspect of these embodiments the file system manager 110 generates an entry 195 in a volume corruption log 190 by creating the entry 195. In an alternative aspect of these embodiments the file system manager 110 generates an entry 195 in a volume corruption log 190 by moving, or otherwise copying, changing the reference to, etc., the entry 185 in the volume verification log 180 for the confirmed error to the respective volume corruption log 190.

In alternative embodiments the spot corruption verifier 135 also, or alternatively, generates an entry 195 identifying a confirmed error in the volume corruption log 190 for a volume 170. In an aspect of these alternative embodiments spot corruption verifier 135 generates an entry 195 in a volume corruption log 190 by creating the entry 195. In an alternative aspect of these alternative embodiments the spot corruption verifier 135 generates an entry 195 in a volume corruption log 190 by moving, or otherwise copying, changing the reference to, etc., the entry 185 in the volume verification log 180 for the confirmed error to the respective volume corruption log 190.

In an embodiment the file system 100 has a proactive error scanner component 145. In an embodiment the proactive error scanner 145 is a software application task that is initiated to execute by the file system manager 110 and has the capability to proactively scan, i.e., check, a file system's volumes 170 for errors associated with the data structures stored thereon. In an embodiment the proactive error scanner 145 performs actions that are designed to identify, i.e., detect, corruptions on the volumes 170 of the file system 100. In an aspect of this embodiment these actions include reading the data structures of a volume 170 and checking whether, or otherwise verifying that, the volume's data structures are internally consistent.

In an embodiment the proactive error scanner 145 operates while the file system's volumes 170 remain online, and thus, each of the file system's volumes 170 are available while the proactive error scanner 145 executes.

In an embodiment the proactive error scanner 145 is initiated, or otherwise invoked, to run, i.e., execute, upon the identification of a confirmed corruption in a volume 170 of the file system 100. In an aspect of this embodiment the file system manager 110 invokes the proactive error scanner 145 to execute subsequent to the spot corruption verifier 135 verifying a prior identified volume corruption.

In a second embodiment the proactive error scanner 145 is initiated to run at identified time intervals if at least one prior identified volume corruption has been verified by the spot corruption verifier 135. In an aspect of this second embodiment the file system manager 110 invokes the proactive error scanner 145 to execute at predetermined periodic time intervals when there is at least one entry 195 in a volume corruption log 190.

In a third embodiment the file system manager 110 schedules the proactive error scanner 145 to be invoked, at some time interval, e.g., once a day at midnight, once a week on Sunday night at eleven-thirty p.m., once a month on the first Sunday night of the month at one o'clock a.m., etc., as programmed by a system administrator 105 or user 105, also collectively referred to herein as user 105. In an aspect of this third embodiment meaningful defaults are established within the file system 100 for ensuring that the proactive error scanner 145 executes at some time interval, e.g., at least once a month, etc., upon circumstances where other time intervals are not, or not properly, established, e.g., have not been programmed by a user 105, are inappropriate or in error, e.g., only once a year, once every minute, etc., have been inadvertently deleted or corrupted, etc.

In a fourth embodiment the proactive error scanner 145 is launched, i.e., invoked to execute, when commanded by a user 105. In an aspect of this fourth embodiment, a user 105 can issue a command, or provide some input, e.g., a request, collectively referred to herein as a command, for the proactive error scanner 145 to execute. In this aspect of this fourth embodiment, the user command is received by the file system manager 110. In this aspect of this fourth embodiment, upon receiving the user command for proactive error scanning, the file system manager 110 invokes the proactive error scanner 145 to execute.

In an embodiment the proactive error scanner 145 scans for corruptions only on the volumes 170 of the file system 100 whose respective dirty bit 120 is set at the time the proactive error scanner 145 processes; i.e., the proactive error scanner 145 only processes the volumes 170 of the file system 100 that have confirmed corruptions when the proactive error scanner 145 is processing.

In an alternative embodiment, when activated to execute, the proactive error scanner 145 scans for corruptions on all of the file system's volumes 170.

In an embodiment when the proactive error scanner 145 encounters, or otherwise discovers, a volume corruption the proactive error scanner 145 initiates for execution the corruption self-healer 155 to attempt to remedy the volume corruption while the volume 170 is maintained online. In this embodiment, if the corruption self-healer 155 is unsuccessful in remedying the discovered volume corruption the proactive error scanner 145 notifies the file system manager 110 and the file system manager 110 thereafter generates an entry 195 in the volume corruption log 190 for the respective volume 170, identifying the discovered volume corruption, i.e., now confirmed corruption. In an aspect of this embodiment the file system manager 110 generates an entry 195 in a volume corruption log 190 by creating the entry 195. In an alternative aspect of this embodiment the file system manager 110 generates an entry 195 in a volume corruption log 190 for which a volume verification log entry 185 exists by moving, or otherwise copying, changing the reference to, etc., the entry 185 in the volume verification log 180 for the confirmed error to the respective volume corruption log 190.

In an alternative embodiment, if the corruption self-healer 155 is unsuccessful in remedying a discovered volume corruption the proactive error scanner 145 thereafter generates an entry 195 in the volume corruption log 190 for the respective volume 170, identifying the now confirmed corruption. In an aspect of this alternative embodiment the proactive error scanner 145 generates an entry 195 in a volume corruption log 190 by creating the entry 195. In an alternative aspect of this alternative embodiment proactive error scanner 145 generates an entry 195 in a volume corruption log 190 for which a volume verification log entry 185 exists by moving, or otherwise copying, changing the reference to, etc., the entry 185 in the volume verification log 180 for the confirmed error to the respective volume corruption log 190

In an alternative embodiment the proactive error scanner 145 notifies the file system manager 110 when it encounters, or otherwise discovers, a volume corruption. In this alternative embodiment the file system manager 110 then initiates for execution the corruption self-healer 155 to attempt to remedy the volume corruption while the volume 170 is maintained online. In this alternative embodiment, if the corruption self-healer 155 is unsuccessful in remedying the discovered volume corruption, the file system manager 110 generates an entry 195 in the volume corruption log 190 for the respective volume 170, identifying the now confirmed corruption.

An embodiment file system 100 has a spot corruption corrector component 125. In an embodiment the spot corruption corrector 125 is a software application task that is initiated to execute by the file system manager 110 and has the capability to attempt to correct confirmed corruptions, i.e., errors in the file system volumes 170 that are identified by entries 195 in volume corruption logs 190. In an embodiment the spot corruption corrector 125 operates while the associated volume 170 to be repaired, or otherwise corrected, is offline. In an embodiment the spot corruption corrector 125 maintains a volume 170 offline only for as long as it is necessary for the sport corruption corrector 125 to repair confirmed corruptions associated with data structures stored thereon.

In an embodiment the file system manager 110 schedules the execution of the spot corruption corrector 125 to minimize the impact to system processing, availability and user satisfaction. In an embodiment the file system manager 110 schedules the execution of the spot corruption corrector 125 with input from a user 105. In an embodiment the file system manager 110 schedules the execution of the spot corruption corrector 125 based on the nature and severity of identified confirmed corruptions.

In an embodiment if the file system 100 is on a server system the spot corruption corrector 125 is initiated to process by the file system manager 110 when the file system boots up, i.e., initializes to run, if there are any entries 195 in the volume corruption log 190 for the system volume 170. In this embodiment, where bringing the system up, i.e., online and processing normally, is of import, this functionality helps to minimize boot up processing time.

In an embodiment if the file system 100 is on a client system the spot corruption corrector 125 is initiated to process by the file system manager 110 when the file system boots up if there are any entries 195 in any volume corruption log 190 for any volume 170, system or otherwise, i.e., general purpose. In this embodiment, where ease of management and automation of repair is of import, this functionality helps to ensure proper file system data structure integrity and consistency.

In embodiments the spot corruption corrector 125 is also, or alternatively, initiated to process by the file system manager 110 when requested by a user 105. In these embodiments, a user 105 is notified of, or otherwise has access to information identifying, confirmed corruptions and a user 105 can issue a command or other type of input, e.g., a request, collectively referred to herein as command, for the file system manager 110 to attempt to correct one or more of the existing confirmed corruptions. Upon receiving a user command to correct one or more existing confirmed corruptions the file system manager 110 invokes the spot corruption corrector 125 to execute.

In embodiments the spot corruption corrector 125 is also, or alternatively, initiated to process by the file system manager 110 when the file system 100 renders a determination that the spot corruption corrector 125 ought to process. In embodiments, the file system manager 110 can determine the spot corruption corrector 125 can process on one or more of a variety of conditions, e.g., when the file system manager 110 determines that the nature and/or severity of one or more confirmed corruptions warrants immediate remedial action, when the file system manager 110 determines that it is an appropriate time to attempt to remedy confirmed corruptions, such as, but not limited to, when the file system manager 110 determines that access to the file system volumes 170 with confirmed errors is sufficiently low, etc.

In an embodiment the spot corruption corrector 125 clears a volume's dirty bit 120 when it successfully corrects all the confirmed corruptions on the respective volume 170. In an alternative embodiment the file system manager 110 clears a volume's dirty bit 120 when the file system manager 110 is notified that the spot corruption corrector 125 successfully corrected all confirmed corruptions on the respective volume 170.

In an embodiment each volume 170 has an associated F bit, or full check flag, 130 that, when set, indicates that the volume 170 has at least one existing confirmed corruption on it that the spot corruption corrector 125 could not successfully remedy. In an embodiment the spot corruption corrector 125 sets a volume's F bit 130 when it is unsuccessful in its attempt to correct a confirmed corruption on the respective volume 170. In an alternative embodiment the file system manager 110 sets a volume's F bit 130 when the file system manager 110 is notified that the spot corruption corrector 125 could not correct an existing confirmed corruption.

An embodiment file system 100 has a full check disk, also referred to herein as full chkdsk, component 165. In an embodiment full chkdsk 165 is a software application task that is initiated to execute by the file system manager 110 and has the capability to identify, verify and attempt to correct volume corruptions. In an embodiment full chkdsk 165 is a volume repair utility, or task, charged with searching for and correcting volume corruptions on those volumes 170 of a file system 100 that have prior identified confirmed corruptions that have not yet been successfully remedied; i.e., volumes with their F bit 130 set.

In an alternative embodiment full chkdsk 165 is a system-wide volume repair task charged with searching for and correcting volume corruptions on all file system volumes 170.

In an embodiment full chkdsk 165 operates while the file system volume 170 that it is currently processing is offline, and thus unavailable. In an embodiment during system boot time full chkdsk 165 processes while all the volumes 170 of the file system are simultaneously offline.

In an embodiment full chkdsk 165 is initiated to process when requested, or otherwise commanded, collectively referred to herein as commanded, by a user 105 and the F bit 130 for a volume 170 is set, i.e., there is at least one existing confirmed corruption that the spot corruption corrector 125 could not successfully remedy. In an alternative embodiment full chkdsk 165 is initiated to process when commanded by a user 105 whether or not an F bit 130 is set for any volume 170; i.e., whether or not there is an existing confirmed corruption for any volume 170.

In an embodiment full chkdsk 165 can also, or alternatively, be initiated to process when the file system manager 110 determines to attempt to immediately remedy one or more existing confirmed corruptions that the spot corruption corrector 125 was unsuccessful in correcting.

In an embodiment full chkdsk 165 is initiated to process by the file system manager 110.

FIGS. 2A-2F illustrates an embodiment logic flow for an embodiment file system 100 supporting resiliency management. While the following discussion is made with respect to systems portrayed herein the operations described may be implemented in other systems. The operations described herein are not limited to the order shown. Additionally, in other alternative embodiments more or fewer operations may be performed. Further, the operations depicted may be performed by embodiment file system components as described and/or by other file system components or combinations of file system components.

Figure 2A:
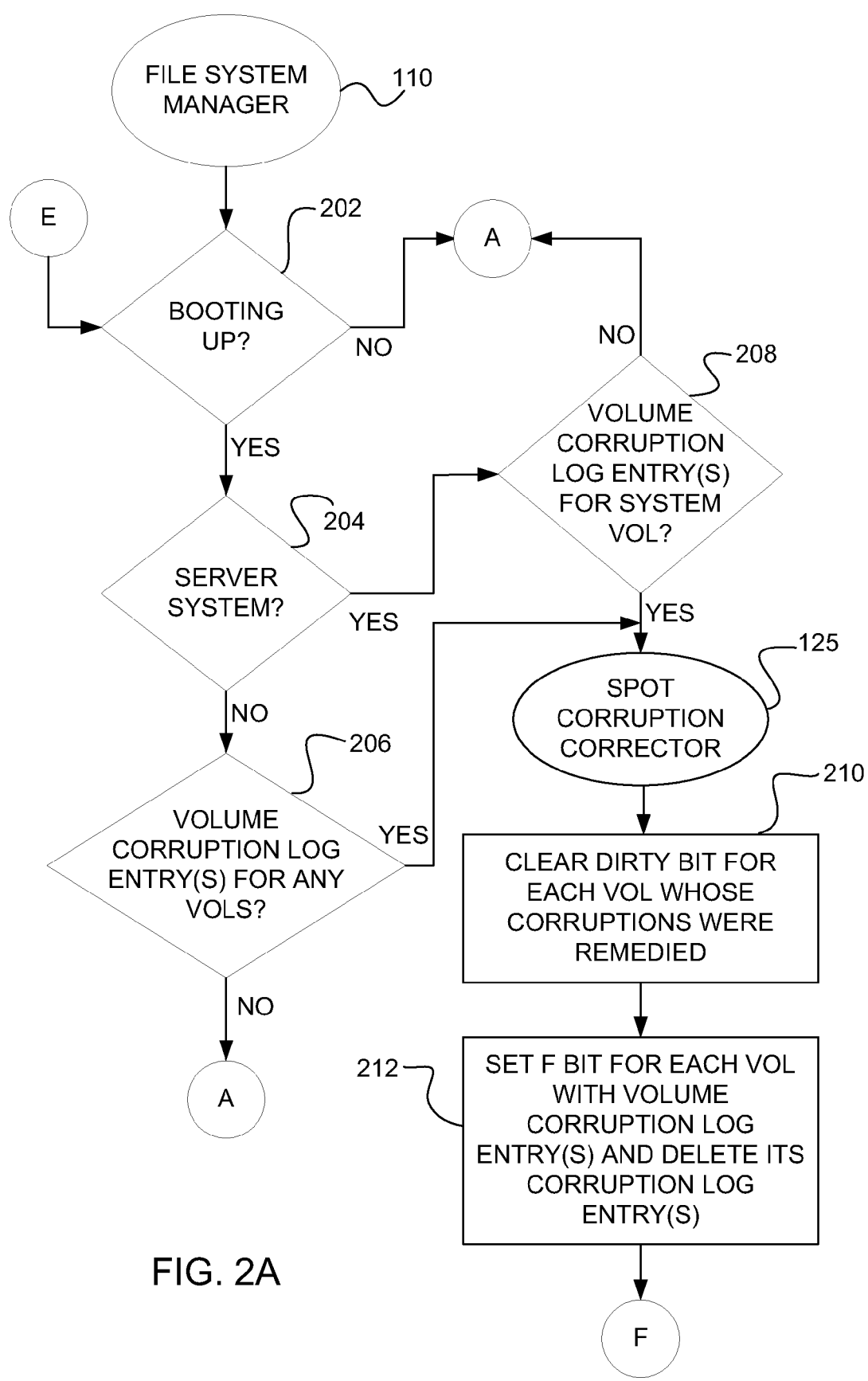
FIGS. 2A-2F illustrate an embodiment logic flow for a file system supporting data structure error detection and correction resiliency management.

Referring to FIG. 2A in an embodiment the file system manager 110 executes to process file system resiliency management and manage the error identification, verification and correction in an embodiment file system 100.

At decision block 202 a determination is made as to whether it is system boot time, i.e., whether or not the file system is booting up and initializing to process. If yes, at decision block 204 a determination is made as to whether the file system is on a server system. If yes, at decision block 208 a determination is made as to whether there are any entries in the volume corruption log for the system volume; i.e., a determination is made as to whether the system volume 170 currently has any confirmed corruptions.

In an aspect of this embodiment this determination is rendered based on a view, or review, of the system volume's corruption log 190 to determine whether there are current entries 195 therein. In an alternative aspect of this embodiment, a dirty bit 120 is set for each volume 170 that has any current entries 195 in its associated volume corruption log 190, and the dirty bit 130 for the system volume 170 is reviewed, or otherwise checked, to determine if the system volume's volume corruption log 190 has any current entries 195. In other alternative aspects of this embodiment other mechanisms, e.g., other flags, combinations of flags, interrupt(s), etc., are utilized to assist in rendering a determination of whether or not the system volume's volume corruption log 190 currently has any entries 195.

If at decision block 208 it is determined that the system volume's volume corruption log has current entries then in an embodiment the spot corruption corrector 125 is initiated to process. In an aspect of this embodiment the spot corruption corrector 125 is activated to process the entries in the system volume's volume corruption log 190, and thus, to attempt to correct corruptions in the system volume.

Referring back to decision block 204, if the file system is not on a server system then in an embodiment the file system is on a client system and at decision block 206 a determination is made as to whether there are any entries in any volume's volume corruption log; i.e., a determination is made as to whether any volume 170 currently has any confirmed corruptions.

In an aspect of this embodiment this determination is rendered based on a view, or review, of one or more volume corruption logs 190 to determine whether there are any current entries 195 in any volume corruption log 190. In an alternative aspect of this embodiment, the dirty bit 120 for one or more volumes 170 is (are) reviewed, or otherwise checked, to determine if at least one volume corruption log 190 has current entries 195. In other alternative aspects of this embodiment other mechanisms, e.g., other flags, combinations of flags, interrupt(s), etc., are utilized to assist in rendering a determination of whether or not any volume corruption log 190 currently has any entries 195.

If at decision block 206 at least one volume corruption log has current entries then in an embodiment the spot corruption corrector 125 is initiated to process. In an aspect of this embodiment the spot corruption corrector 125 is activated to process all current entries 195 in each volume corruption log 190, and thus, to attempt to correct all existing confirmed corruptions in the volumes 170 of the file system 100.

In an embodiment the dirty bit for each volume whose existing confirmed corruptions are corrected by the spot corruption corrector is cleared 210.

In an embodiment the F bit for each volume that has a confirmed corruption that the spot corruption corrector could not remedy is set 212.

In an embodiment existing corruption log entries for any volume that has a confirmed corruption that the spot corruption corrector could not remedy are deleted, or otherwise rendered irrelevant or non-current, 212.

Figure 2B:
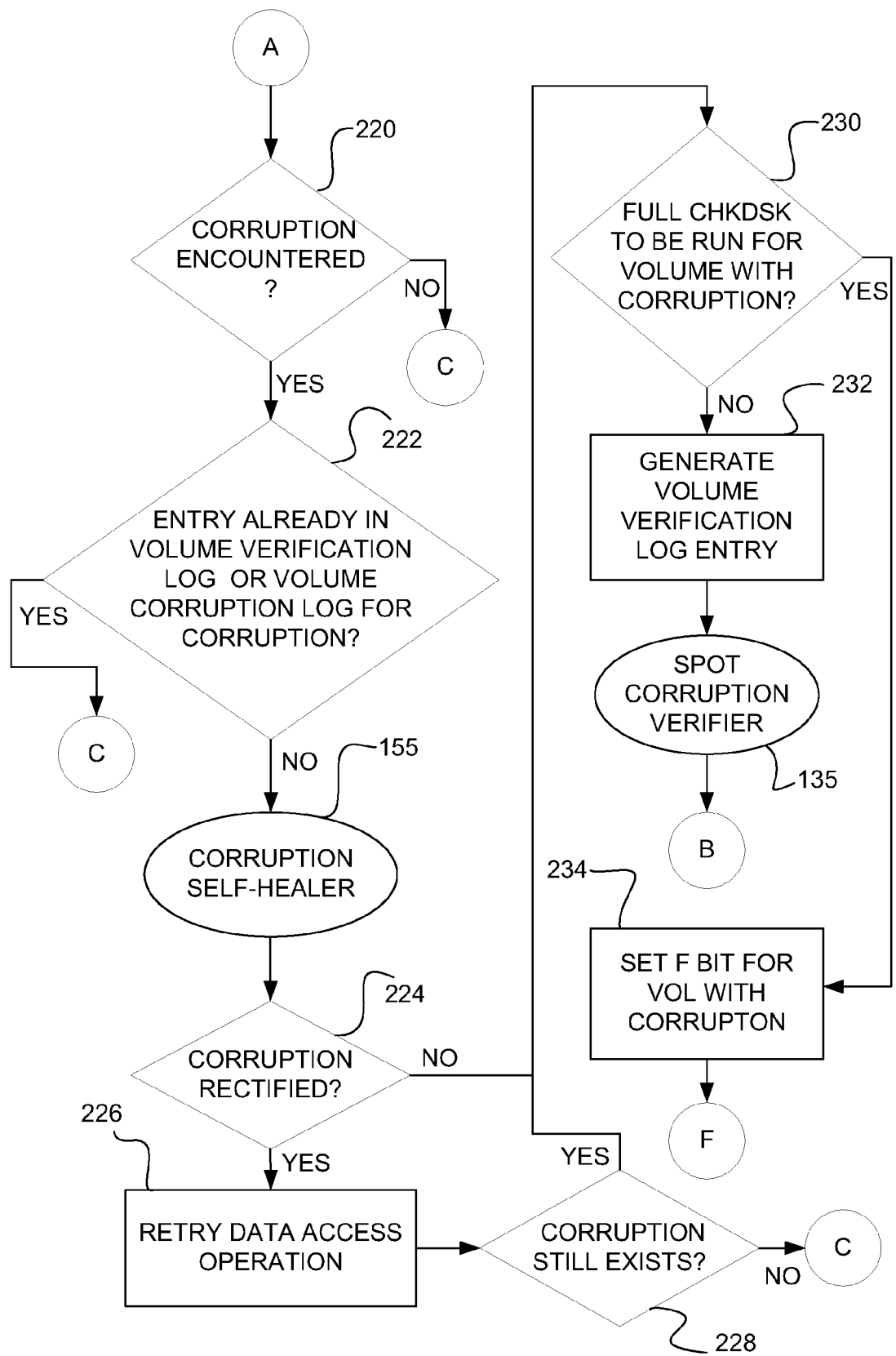

If at decision block 202 the file system is not currently booting up, at decision block 206 there are no current confirmed corruptions for any volume of a client file system, or at decision block 208 there are no current confirmed corruptions for the system volume of a server file system, then in an embodiment, and referring to FIG. 2B, at decision block 220 a determination is made as to whether a volume corruption has been encountered on a file system volume. In an aspect of this embodiment a volume corruption can be encountered when a processing task 115, a user 105 or the file system manager 110 is attempting to access at least one data structure on a volume 170 of the file system 100.

If a volume corruption has been encountered, then in an embodiment at decision block 222 a determination is made as to whether there already exists an entry in the volume verification log or the volume corruption log for the respective volume for the encountered volume corruption. In an aspect of this embodiment, if the current encountered volume corruption has already been flagged, or otherwise logged, by virtue of an entry in a respective volume error log, i.e., a volume verification log 180 or a volume corruption log 190, then the current volume corruption has been previously encountered and identified within the file system 100.

If at decision block 222 there is no current entry in a volume verification log or a volume corruption log for the current encountered volume corruption then in an embodiment the corruption self-healer 155 is initiated to process. In an aspect of this embodiment the corruption self-healer 155 is initiated to process by the file system manager 110.

In an embodiment the corruption self-healer 155 processes while the volume 170 with the currently encountered volume corruption remains online, and thus accessible.

In an embodiment at decision block 224 a determination is made as to whether the corruption self-healer remedied the currently encountered volume corruption. If no, in an embodiment at decision block 230 a determination is made as to whether the currently encountered corruption warrants full chkdsk being run for the respective volume. In an aspect of this embodiment the file system manager 110 renders this determination.

If at decision block 230 it is determined that full chkdsk processing is warranted for the current volume corruption then in an embodiment the F bit is set for the volume with the corruption 234.

If however, at decision block 230 a full chkdsk is not deemed warranted then in embodiment an entry is generated in the respective volume's volume verification log that identifies the volume corruption 232.

In an aspect of this embodiment the file system manager 110 generates a volume verification log entry 185 for the currently encountered volume corruption upon notification from the corruption self-healer 155 that the corruption self-healer 155 could not correct the volume corruption. In an alternative aspect of this embodiment the corruption self-healer 155 generates a respective volume verification log entry 185 when it fails to successfully correct the currently encountered volume corruption.

If at decision block 224 it is determined that the currently encountered volume corruption has been corrected then in an embodiment the data access operation that encountered the volume corruption is retried 226.

In an embodiment at decision block 228 a determination is made as to whether the same volume corruption occurs again; i.e., whether the volume corruption has, in fact, not been successfully remedied by the corruption self-healer. If yes, in an embodiment at decision block 230 a determination is made as to whether the currently encountered corruption warrants full chkdsk being run for the respective volume.

Subsequent to an entry being generated for a volume verification log 232, in an embodiment the spot corruption verifier 135 is invoked to process. In an aspect of this embodiment, the file system manager 135 initiates the spot corruption verifier 135 to process.

In an embodiment, once invoked to execute, the spot corruption verifier 135 attempts to verify each volume corruption that has a currently existing volume verification log entry 185. In an embodiment the spot corruption verifier 135 attempts to verify the currently existing volume corruptions with respective existing volume verification log entries 185 while the file system's volumes 170 remain online and available.

Figure 2C:
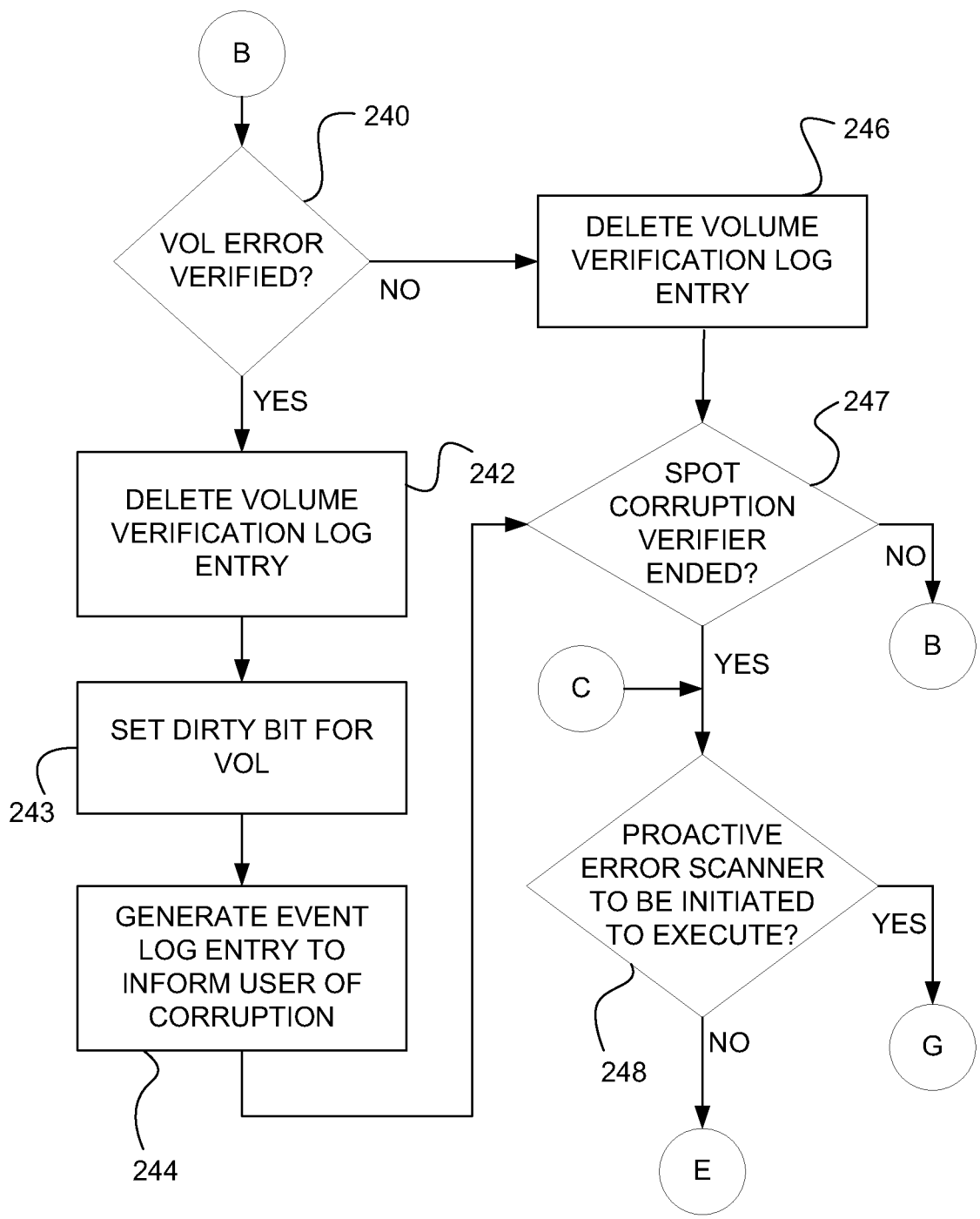

In an embodiment and referring to FIG. 2C at decision block 240 a determination is made as to whether the spot corruption verifier 135 has verified a volume corruption. If no, there is a false positive for an existing volume verification log entry; i.e., the spot corruption verifier 135 has determined that a volume corruption does not in fact exist. In an embodiment the entry for the false positive corruption in the respective volume verification log is deleted, or otherwise rendered irrelevant or non-current, 246.

In an aspect of this embodiment the spot corruption verifier 135 notifies the file system manager 110 that an existing volume corruption is a false positive and the file system manager 110 deletes, or otherwise renders irrelevant or non-current, the respective entry 185 for the volume corruption in the volume verification log 180. In an alternative aspect of this embodiment the spot corruption verifier 135, upon identifying a false positive corruption, deletes, or otherwise renders irrelevant or non-current, the respective entry 185 for the volume corruption in the volume verification log 180.

In an embodiment at decision block 247 a determination is made as to whether the spot corruption verifier processing has ended; i.e., whether there are any more current volume verification log entries to process.

If at decision block 240 the spot corruption verifier has verified a volume corruption then in an embodiment the volume verification log entry for the now confirmed corruption is deleted, or otherwise rendered irrelevant or non-current, 242. In an aspect of this embodiment the spot corruption verifier 135 notifies the file system manager 110 of the confirmed corruption and the file system manager 110 deletes, or otherwise renders irrelevant or non-current, the respective entry 185 for the confirmed corruption in the volume verification log 180. In an alternative aspect of this embodiment the spot corruption verifier 135, upon verifying a volume corruption, deletes, or otherwise renders irrelevant or non-current, the respective entry 185 for the corruption in the volume verification log 180.

In an embodiment the dirty bit for the volume with the confirmed corruption is set 243.

In an aspect of this embodiment the spot corruption verifier 135 notifies the file system manager 110 of the now confirmed corruption and the file system manager 110 sets the appropriate volume dirty bit 120. In an alternative aspect of this embodiment the spot corruption verifier 135, upon verifying a volume corruption sets the appropriate volume dirty bit 120.

In an embodiment an event log entry is generated that can be used to inform a user 105 of a confirmed corruption 244. In an embodiment the event log entry is an entry in an event log, e.g., log, table, file, etc., collectively referred to herein as log, that a user 105 can access to be apprised of the confirmed corruption. In embodiments the event log is output, or otherwise made accessible, to the user 105. In an alternative embodiment the file system manager 110 uses the event log entries to generate messages that are output to a user 105.

In an embodiment at decision block 247 a determination is made as to whether the spot corruption verifier processing has ended.

If at decision block 247 the spot corruption verifier is still currently processing, then in an embodiment at decision block 240 it is determined whether the spot corruption verifier has verified a volume corruption with an existing volume verification log entry.

If at decision block 247 the spot corruption verifier has ended processing, then in an embodiment at decision block 248 a determination is made as to whether a condition exists for the proactive error scanner to be initiated to process. In an embodiment the proactive error scanner 145 is initiated to process when, subsequent to spot corruption verifier 135 processing, any volume's dirty bit is set, indicating that there is at least one existing confirmed corruption on at least one volume of the file system.

As previously noted, in embodiments the file system manager 110 initiates the proactive error scanner 145 to process under additional and/or alternative conditions, i.e., at identified time intervals if at least one prior identified volume corruption has been verified by the spot corruption verifier 135, at some time interval as programmed by a user 105, or when commanded by a user 105. Thus, even if at decision block 220 of FIG. 2B there is no currently encountered corruption, or at decision block 222 an error log entry already exists for a currently encountered corruption, or at decision block 228 a volume corruption was resolved by the corruption self-healer 155, at decision block 248 of FIG. 2C it is determined if a condition exists for the proactive error scanner 145 to be initiated to process.

Figure 2D:
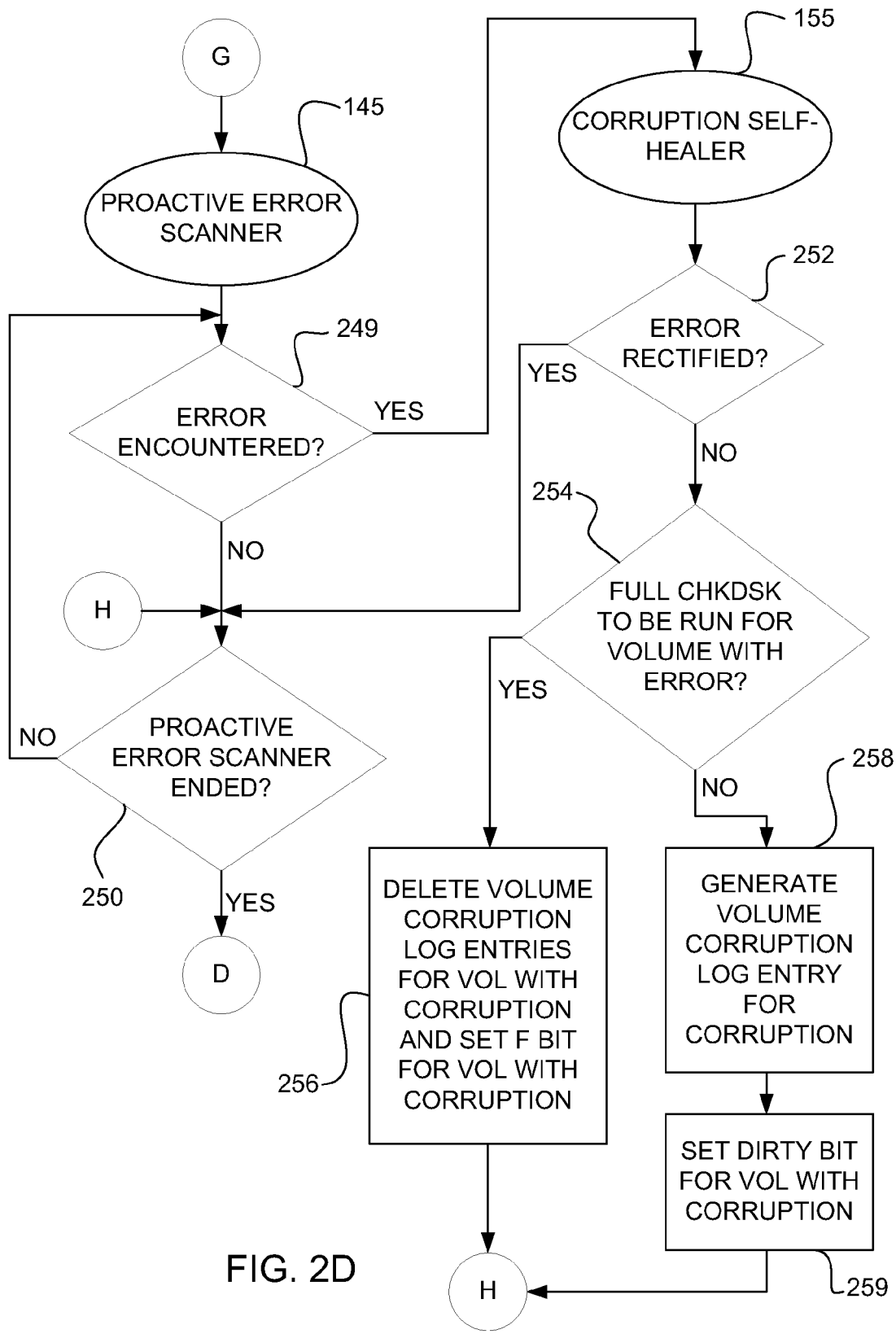

If at decision block 248 a condition exists for the proactive error scanner 145 to be initiated to process then in an embodiment, and referring to FIG. 2D, the proactive error scanner 145 is initiated to process. In an aspect of this embodiment the file system manager 110 initiates the processing of the proactive error scanner 145.

In an embodiment the proactive error scanner 145 scans for corruptions only on those volumes 170 of the file system 100 for which the respective dirty bit 120 is set. In an alternative embodiment the proactive error scanner 145 scans for corruptions on all of the file system's volumes 170. In an embodiment the proactive error scanner 145 scans for corruptions while all the file system's volumes 170 remain online and accessible.

In an embodiment at decision block 249 a determination is made as to whether the proactive error scanner has encountered, or otherwise discovered, a corruption on a volume it is currently processing. If yes, in an embodiment the proactive error scanner initiates for execution the corruption self-healer 155 to attempt to remedy the volume corruption while the volume is maintained online.

If at decision block 249 there is no encountered volume corruption then in an embodiment at decision block 250 a determination is made as to whether the proactive error scanner is finished processing. If no, in an embodiment a determination is again made as to whether the proactive error scanner has encountered a corruption on the volume it is currently processing.

In an embodiment at decision block 252 it is determined whether the corruption self-healer was successful in remedying the currently discovered corruption. If no, in an embodiment at decision block 254 it is determined whether the currently encountered corruption warrants full chkdsk being run for the respective volume.

If at decision block 254 it is determined that full chkdsk processing is warranted for the current volume corruption then in an embodiment the existing corruption log entries for the volume with the current volume corruption are deleted, or otherwise rendered irrelevant or non-current, 256. In an embodiment the F bit is set for the volume with the current volume corruption 256.

If however, at decision block 254 a full chkdsk is not deemed warranted then in an embodiment an entry is generated for the corruption in the respective volume's volume corruption log 258. Thus, at this juncture and in an embodiment corruption log entries are generated for each corruption the proactive error scanner identifies that cannot be successfully remedied by the corruption self-healer 258.

In an embodiment the dirty bit is set for the volume with the corruption 259.

In an embodiment, if the corruption self-healer 155 is unsuccessful in remedying a discovered volume corruption the proactive error scanner 145 notifies the file system manager 110 and the file system manager 110 thereafter generates an entry 195 in the volume corruption log 190 for the respective volume 170, identifying the discovered volume corruption, i.e., now confirmed corruption. In an aspect of this embodiment the file system manager 110 also sets the dirty bit 120 for a volume 170 that the proactive error scanner 145 identifies a corruption on which is not successfully corrected during proactive error scanner 145 processing. In an alternative aspect of this embodiment the file system manager 110 sets the dirty bit 120 for a volume 170 whose dirty bit 120 is not set when the proactive error scanner 145 notifies the file system manager 110 of an identified volume corruption that has not been successfully corrected during proactive error scanner 145 processing.

In an alternative embodiment, if the corruption self-healer 155 is unsuccessful in remedying a discovered volume corruption the proactive error scanner 145 thereafter generates an entry 195 in the volume corruption log 190 for the respective volume 170, identifying the now confirmed corruption. In an aspect of this alternative embodiment the proactive error scanner 145 also sets the dirty bit 120 for a volume 170 that the proactive error scanner 145 identifies a corruption on which is not corrected during proactive error scanner 145 processing. In an alternative aspect of this alternative embodiment the proactive error scanner 145 sets the dirty bit 120 for a volume 170 whose dirty bit 120 is not set when the proactive error scanner 145 identifies a corruption on the volume 170 that cannot be successfully corrected during proactive error scanner 145 processing.

In an embodiment, whether a full chkdsk was deemed warranted for a current volume corruption at decision block 250 a determination is made as to whether the proactive error scanner has completed processing. In an aspect of this embodiment, if at decision block 254 it is determined that full chkdsk processing is warranted for the current volume corruption then proactive error scanner ends processing of the respective volume.

If at decision block 252 the corruption self-healer was successful in remedying the currently discovered corruption then in an embodiment at decision block 250 a determination is made as to whether the proactive error scanner has completed processing.

Figure 2E:
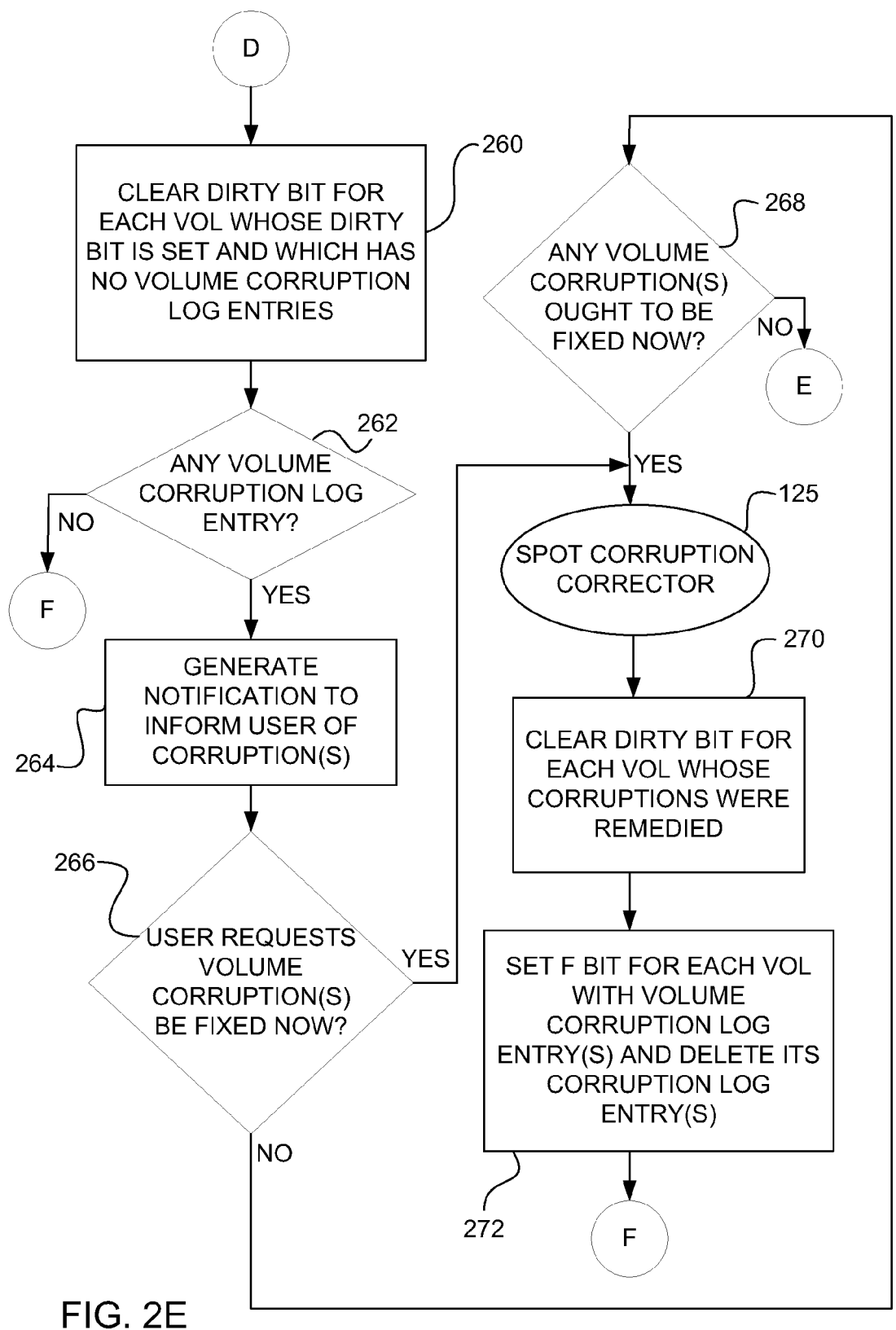

In an embodiment, and referring to FIG. 2E, subsequent to the processing of the proactive error scanner 145, the dirty bit for each volume of the file system whose dirty bit is set and which now has no volume corruption log entries, i.e., currently has no confirmed corruptions, is cleared 260. In an aspect of this embodiment the file system manager 110 clears the dirty bit 120 for each volume 170 of the file system 100 whose dirty bit 120 is set and which, following the processing of the proactive error scanner 145, has no volume corruption log entries 195. In an alternative aspect of this embodiment the proactive error scanner 145 clears the dirty bit 120 for each volume 170 of the file system 100 that the proactive error scanner 145 processes, that has its dirty bit 120 set and, following processing by the proactive error scanner 145, has no volume corruption log entries 195.

In an embodiment at decision block 262 a determination is made as to whether there is any volume corruption log entries for any volume of the file system. In an embodiment a volume corruption log entry 195 was generated for each corruption the proactive error scanner 145 identified that was not corrected online during the proactive error scanner's processing and which was not otherwise determined to be of sufficient seriousness and/or complexity that full chkdsk processing is warranted for the respective volume.

If at decision block 262 there is at least one volume corruption log entry then in an embodiment a notification is generated that can be used to inform a user of the existing confirmed corruption(s) 264. In an embodiment the generated notification is an event log entry, i.e., an entry in an event log, that a user 105 can access to be apprised of the confirmed corruptions. In an embodiment the event log is output, or otherwise made accessible, to the user 105. In an alternative embodiment the file system manager 110 uses the event log entries to generate messages that are output to a user 105.

In other embodiments the generated notification is one or more additional and/or other mechanisms that inform and/or can be used to inform a user 105 of the existing confirmed corruptions(s), e.g., a pop-up message output to a user 105, other and/or additional log entries, a flag, etc.

In an embodiment at decision block 266 a determination is made as to whether a user has requested or commanded, collectively referred to herein as commanded, that currently existing corruptions identified by entries in one or more volume corruption logs be processed for correction at this time. If yes, in an embodiment the spot corruption corrector 125 is initiated to process to attempt to rectify existing corruptions identified by volume corruption log entries. In an aspect of this embodiment the spot corruption corrector is initiated to process by the file system manager 110.

In an aspect of this embodiment the spot corruption corrector 125 takes volumes 170 offline to process for attempting to correct prior identified corruptions thereon. In an aspect of this embodiment the spot corruption corrector 125 takes volumes 170 offline one at a time to process for attempting to correct prior identified corruptions thereon so that at any one time only one volume 170 of the file system is offline, and therefore not accessible to other processing tasks 115 and/or users 105. In an aspect of this embodiment the spot corruption corrector 125 maintains a volume 170 offline only for as long as it is necessary for the spot corruption corrector 125 to process the entries in the respective volume's volume corruption log 190; i.e., only for as long as it is necessary for the spot corruption corrector 125 to attempt to correct previously identified corruptions thereon.

In an embodiment, once invoked the spot corruption corrector 125 continues processing until it has attempted to correct all currently existing corruptions identified by respective volume corruption log entries 195.

In an embodiment a volume dirty bit is cleared for each volume whose volume corruption log contains no current entries subsequent to the processing of the spot corruption corrector 270. In an aspect of this embodiment the file system manager 110 clears the volume dirty bit 120 for each volume

170 whose confirmed corruptions were all corrected during the processing of the spot corruption corrector 125. In an alternative aspect of this embodiment the spot corruption corrector 125 clears the volume dirty bit 120 for each volume 170 in which the spot corruption corrector 125 remedies all current confirmed corruptions.

In an embodiment an F bit is set for each volume of the file system that has confirmed corruptions that the spot corruption corrector was unsuccessful in remedying 272.

In an embodiment existing corruption log entries for any volume that has a confirmed corruption that the spot corruption corrector could not remedy are deleted, or otherwise rendered irrelevant or non-current, 272.

If at decision block 266 a user has not requested any currently existing corruptions be processed for correction, in an embodiment at decision block 268 a determination is made as to whether the file system deems any currently existing corruptions identified by entries in or more volume corruption logs can and/or ought to be processed for correction at this time.

In embodiments the file system manager 110 can determine, with or without user input, that the nature and/or severity of one or more currently existing confirmed corruptions warrants immediate remedial action. In an aspect of these embodiments the file system manager 110, utilizing information in the entries 195 for the volume corruption logs 190, makes a determination as to whether there is at least one suitably serious existing corruption that ought to be attempted to be corrected at this time.

In embodiments the file system manager 110 can also, or alternatively, determine that it is an appropriate time to attempt to remedy one or more existing confirmed corruptions; e.g., that access to the file system volumes with confirmed errors is sufficiently low at the present time that an attempted correction of the confirmed corruptions will pose minimal negative impact on file system volume availability, etc.

If at decision block 268 the file system manager deems at least one currently existing corruption identified by an entry in a volume corruption log can and/or ought to be processed for correction at this time, in an embodiment the spot corruption corrector 125 is In an embodiment at this juncture the spot corruption corrector 125 is initiated to process all existing volume corruption log entries for all file system volumes 170, i.e., all existing confirmed corruptions. In an alternative embodiment at this juncture the spot corruption corrector 125 is initiated to process only a subset of the currently existing confirmed corruptions that the file system manager 110 has determined can and/or ought to be processed for correction at this time.

If at decision block 268 the file system has not determined that any existing confirmed corruptions can and/or ought to be attempted to be corrected at this time then in an embodiment processing returns to decision block 202 of FIG. 2A where a determination is made as to whether the file system is currently booting up.

Figure 2F:
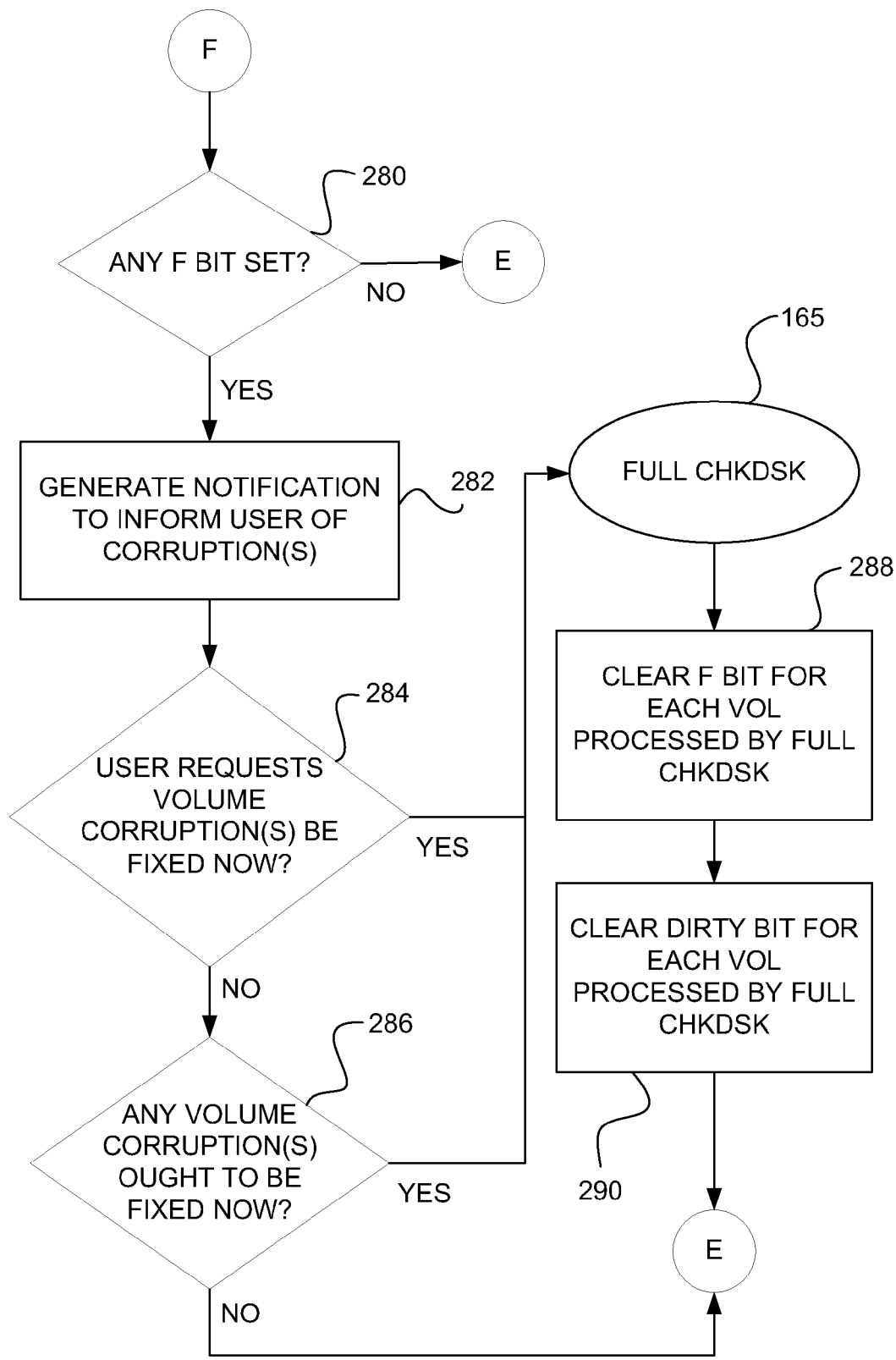

Referring to FIG. 2F, in an embodiment at decision block 280 a determination is made as to whether any volume's F bit is set. If no, there are currently no existing confirmed corruptions for the file system 100 to attempt to correct, and in an embodiment processing returns to decision block 202 of FIG. 2A where it is determined whether the file system is currently booting up.

If at decision block 280 there is one or more volume F bits that are set then in an embodiment one or more notifications are generated that can be used to inform a user of the existing confirmed corruption(s) 282. In an embodiment a generated notification is an event log entry that a user 105 can access to be apprised of the existing confirmed corruptions. In embodiments the event log is output, or otherwise made accessible, to the user 105. In an alternative embodiment the file system manager 110 uses the event log entries to generate messages that are output to a user 105.

In other embodiments a generated notification is one or more additional and/or other mechanisms that inform and/or can be used to inform a user 105 of the existing confirmed corruptions(s), e.g., a pop-up message output to a user 105, other and/or additional log entries, a flag, etc.

In an embodiment at decision block 284 a determination is made as to whether a user has requested or commanded, collectively referred to herein as commanded, that the file system process to correct existing confirmed corruptions at this time. If yes, in an embodiment full chkdsk 165 is initiated to process those volumes whose F bits are set at this time. In an aspect of this embodiment full chkdsk 165 is initiated to process by the file system manager 110.

If at decision block 284 a user has not requested that the file system process to correct volumes with existing corruptions at this time, then in an embodiment at decision block 286 a determination is made as to whether the file system deems any volumes with currently existing confirmed corruptions can and/or ought to be processed for correction at this time.

In embodiments the file system manager 110 can determine that it is an appropriate time to attempt to remedy one or more corrupted volumes; e.g., that access to the file system volumes with confirmed errors is sufficiently low at the present time that an attempted correction of the volumes will pose minimal negative impact on file system volume availability, etc.

If at decision block 286 the file system deems at least one volume can and/or ought to be processed for correction at this time, in an embodiment full chkdsk 165 is initiated to process. In an aspect of this embodiment full chkdsk 165 is initiated to process by the file system manager 110.

In an embodiment at this juncture full chkdsk 165 is initiated to process all volumes 170 whose F bits are currently set, i.e., all volumes 170 with existing confirmed corruptions thereon. In an alternative embodiment at this juncture full chkdsk 165 is initiated to process only a subset of the corrupted volumes 170 that the file system manager 110 has determined can and/or ought to be processed for correction at this time.

In an embodiment, subsequent to full chkdsk 165 processing, the F bit is cleared for each volume processed by full chkdsk 288. In an embodiment, subsequent to full chkdsk 165 processing, the dirty bit is cleared for each volume processed by full chkdsk 290. In an aspect of these embodiments the file system manager 110 clears the F bit 130 and the dirty bit 120 for each volume 170 that was processed by full chkdsk 288. In an alternative aspect of these embodiments full chkdsk 165 clears the F bit 130 and the dirty bit 120 for each volume 170 that full chkdsk 165 processes.

If at decision block 286 the file system does not determine that any corrupted volumes can and/or ought to be attempted to be corrected at this time, or subsequent to full chkdsk 165 processing of one or more volumes of the file system, in an embodiment processing returns to decision block 202 of FIG. 2A where it is determined whether the file system is currently booting up.

Computing Device System Configuration

Figure 3:
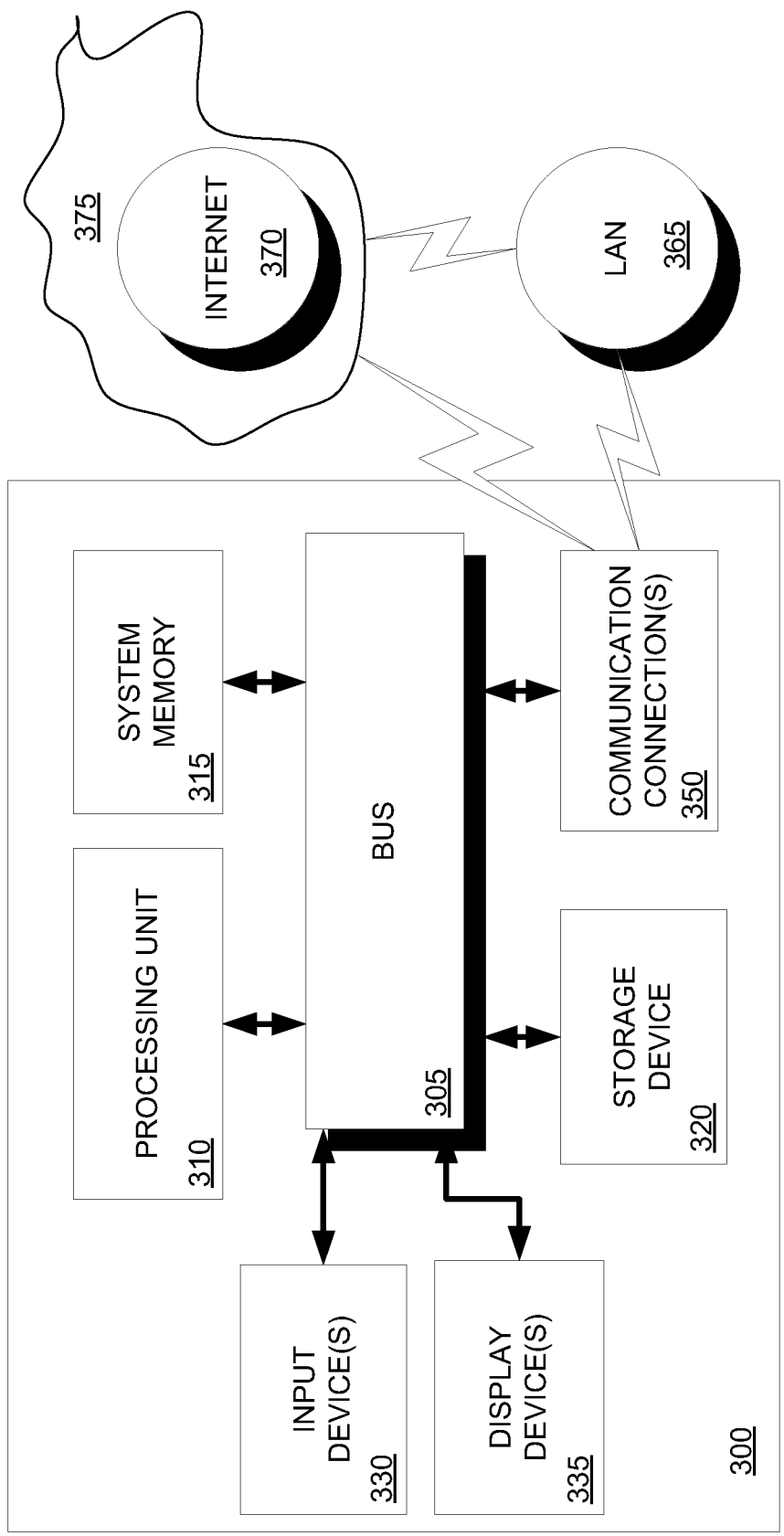
FIG. 3 is a block diagram of an exemplary basic computing device with the capability to process software, i.e., program code, or instructions.

FIG. 3 is a block diagram that illustrates an exemplary computing device system 300 upon which an embodiment can be implemented. Examples of computing device systems, or computing devices, 300 include, but are not limited to, servers, server systems, computers, e.g., desktop computers, computer laptops, also referred to herein as laptops, notebooks, etc.; etc.

The embodiment computing device system 300 includes a bus 305 or other mechanism for communicating information, and a processing unit 310, also referred to herein as a processor 310, coupled with the bus 305 for processing information. The computing device system 500 also includes system memory 315, which may be volatile or dynamic, such as random access memory (RAM), non-volatile or static, such as read-only memory (ROM) or flash memory, or some combination of the two. The system memory 315 is coupled to the bus 305 for storing information and instructions to be executed by the processing unit 310, and may also be used for storing temporary variables or other intermediate information during the execution of instructions by the processor 310. The system memory 315 often contains an operating system and one or more programs, or applications, and/or software code, and may also include program data.

In an embodiment a storage device 320, such as a magnetic or optical disk, solid state drive, flash drive, etc., is also coupled to the bus 305 for storing information, including program code of instructions and/or data, e.g., volumes 170. In the embodiment computing device system 300 the storage device 320 is computer readable storage, or machine readable storage, 320.

Embodiment computing device systems 300 generally include one or more display devices 335, such as, but not limited to, a display screen, e.g., a cathode ray tube (CRT) or liquid crystal display (LCD), a printer, and one or more speakers, for providing information to the computing device's system administrators 105 and users 105. Embodiment computing device systems 300 also generally include one or more input devices 330, such as, but not limited to, a keyboard, mouse, trackball, pen, voice input device(s), and touch input devices, which the system administrators 105 and users 105 can utilize to communicate information and command selections to the processor 310. All of these devices are known in the art and need not be discussed at length here.

The processor 310 executes one or more sequences of one or more programs, or applications, and/or software code instructions contained in the system memory 315. These instructions may be read into the system memory 315 from another computing device-readable medium, including, but not limited to, the storage device 320. In alternative embodiments, hard-wired circuitry may be used in place of or in combination with software instructions. Embodiment computing device system 300 environments are not limited to any specific combination of hardware circuitry and/or software.

The term "computing device-readable medium" as used herein refers to any medium that can participate in providing program, or application, and/or software instructions to the processor 310 for execution. Such a medium may take many forms, including but not limited to, storage media and transmission media. Examples of storage media include, but are not limited to, RAM, ROM, EEPROM, flash memory, solid state drive, CD-ROM, USB stick drives, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 315 and storage device 320 of embodiment computing device systems 300 are further examples of storage media. Examples of transmission media include, but are not limited to, wired media such as coaxial cable(s), copper wire and optical fiber, and wireless media such as optic signals, acoustic signals, RF signals and infrared signals.

An embodiment computing device system 300 also includes one or more communication connections 350 coupled to the bus 305. Embodiment communication connection(s) 350 provide a two-way data communication coupling from the computing device system 300 to other computing devices on a local area network (LAN) 365 and/or wide area network (WAN), including the world wide web, or internet, 370 and various other communication networks 375, e.g., SMS-based networks, telephone system networks, etc. Examples of the communication connection(s) 350 include, but are not limited to, an integrated services digital network (ISDN) card, modem, LAN card, and any device capable of sending and receiving electrical, electromagnetic, optical, acoustic, RF or infrared signals.

Communications received by an embodiment computing device system 300 can include program, or application, and/or software instructions and data. Instructions received by the embodiment computing device system 300 may be executed by the processor 310 as they are received, and/or stored in the storage device 320 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for file system resiliency management for a file system that has a volume, the method comprising:
    detecting a potential corruption of a portion of the volume while the volume is online;
    attempting correction of the potential corruption while the volume is online;
    performing spot corruption verification processing on the volume while the volume is online, wherein the spot corruption verification processing comprises:
        determining whether the potential corruption is actual corruption of the portion or was a false positive detection;
    performing proactive error scan processing on the volume while the volume is online, wherein the proactive error scan processing comprises:
        identifying corruption to another portion of the volume;
        attempting correction of the identified corruption to the other portion of the volume; and
        generating a corruption indication in response to a failure of the attempt to correct the identified corruption; and
    performing spot corruption correction processing on the portion, wherein the spot correction processing comprises attempting to correct the determined actual corruption on the volume while the volume is offline.

2. The method of claim 1, wherein the file system comprises a server file system, the volume comprises a system volume for a server, and the spot corruption correction processing is performed as part of a boot of the server based on indicators of determined actual corruption that were generated prior to the boot.

3. The method of claim 1, wherein:

the file system is associated with a client computing device; and the method further comprises performing the spot corruption correction processing for the volume, as part of a boot of the client computing device, based on indicators of determined actual corruption that were generated prior to the boot.

4. The method of claim 1, wherein:

the volume comprises a volume verification log and a first error flag;

the method further comprises setting the first error flag in response to determination of actual corruption by the spot corruption verification processing; and an initiation of the performance of the proactive error scan processing on the volume is based on a value of the first error flag.

5. The method of claim 4, wherein:

the volume further comprises a volume corruption log and a second error flag;

the corruption indication comprises an entry in the volume corruption log;

the performance of the spot corruption correction processing on the volume is based on the volume corruption log; and the second error flag is set in response to performance of the spot corruption correction processing on the volume not correcting the actual corruption.

6. The method claim 5, further comprising:

performing additional offline processing on the volume based on a value of the second error flag, wherein the additional offline processing includes:
identifying additional corruption to the volume; and
attempting to correct the additional corruption.

7. The method of claim 1, wherein the proactive error scan processing is initiated in response to a user command.

8. The method of claim 1, further comprising:

generating a verification indication for the potential corruption in response to a failure to correct the potential corruption while the volume is online.

9. The method of claim 8, further comprising:

deleting the verification indication in response to the performance of the spot corruption verification processing.

10. The method of claim 1, further comprising:

providing a warning message in response to a failure to correct the identified error by the proactive error scan processing.

11. The method of claim 10, further comprising:

generating an entry in an event log in response to the failure to correct the identified error by the proactive error scan processing.

12. The method of claim 1, further comprising:

performing corruption self-healer processing that comprises:
attempting correction of the potential corruption while the volume is online; and
attempting correction of the actual corruption while the volume is online.

13. The method of claim 1, further comprising:

setting a dirty bit for the volume if the spot corruption verification processing determines that the potential corruption is the actual corruption;

clearing the dirty bit of the volume in response to correction of the actual corruption;

setting a status bit for the volume of the file system in response to a failure to correct the actual corruption by the spot corruption corrector processing; and performing additional offline processing on the volume based on a value of the status bit, wherein the additional offline processing includes:
identifying additional corruption to the volume; and
attempting to correct the additional corruption.

14. The method of claim 1, wherein actual corruption represents one or more errors in a data structure stored on the volume.

15. A computing device for resilient file system management, the computing device comprising:

a storage device having a volume stored thereon, wherein the volume comprises at least one data structure;

a memory adapted to store instructions; and a processor adapted to execute the instructions, the instructions being organized into at least:
a file system manager to manage the file system;
a spot corruption verifier to:
determine if a perceived corruption that has been previously encountered on the volume of the file system is a true data structure corruption comprising a confirmed corruption, and
determine if the perceived corruption that has been previously encountered on the volume of the file system is a false positive comprising an encounter on the volume of the file system that is not the true data structure corruption on the volume of the file system;
a proactive error scanner to identify data structure corruption on the volume of the file system, wherein data structure corruptions identified by the proactive error scanner that are not remedied during proactive error scanner processing comprise confirmed corruptions; and
a spot corruption corrector to attempt to correct the confirmed corruptions.

16. The computing device of claim 15, further comprising a volume verification log for the volume of the file system wherein the volume verification log for the volume comprises at least one entry that identifies a perceived corruption that has been previously encountered on the volume of the file system.

17. The computing device of claim 16, further comprising a volume corruption log for the volume of the file system wherein the volume corruption log for the volume comprises at least one entry that identifies a confirmed corruption.

18. The computing device of claim 15, wherein the instructions are further organized into:

a corruption self-healer to correct a confirmed corruption for the volume of the file system while the volume of the file system is maintained online.

19. The computing device of claim 15, wherein:

the spot corruption verifier is also to determine if a perceived corruption that has been previously encountered on the volume of the file system is a false positive, the proactive error scanner is also to check the volume of the file system for data structure corruption while the volume of the file system is online, and the spot corruption corrector is also to attempt to correct confirmed corruptions on the volume of the file system and other volumes of the file system at separate times and to correct confirmed corruptions on the volume of the file system while the volume of the file system is maintained offline.

20. A method for file system error detection and correction for a file system that comprises at least one volume comprising at least one data structure, the method comprising:

generating verification indications for multiple perceived corruptions on the at least one volume of the file system;

performing spot corruption verification processing for the at least one volume of the file system that has the multiple perceived corruptions for which verification indications have been generated, wherein the spot corruption verification processing comprises determining that at least one of the multiple perceived corruptions that comprise true data structure corruption to be a confirmed corruption, wherein the spot corruption verification processing further comprises determining that at least another of the multiple perceived corruptions that do not comprise true data structure corruption to be a false positive, and wherein the spot corruption verification processing is performed while the volume of the file system is maintained online;

performing proactive error scan processing for the volume of the file system, wherein the proactive error scan processing comprises checking the volume of the file system that has the confirmed corruption to identify additional corruptions thereon, and attempting to remedy the confirmed corruption and the additional corruptions while the volume of the file system is maintained online, and wherein each of the additional corruptions that is not remedied while the volume of the file system is maintained online comprises an existing corruption; and performing spot corruption correction processing for the volume of the file system that has at least one existing corruption, wherein the spot correction processing for the volume of the file system comprises an attempt to correct each of the existing corruptions on the volume of the file system while the volume of the file system is maintained offline.

* * * * *